United States Patent
Beetz et al.

(10) Patent No.: US 7,819,406 B2
(45) Date of Patent: Oct. 26, 2010

(54) SPLIT STABILIZER WITH OPTIMIZED SPRING RATE

(75) Inventors: Stefan Beetz, Barnin (DE); Winfried Krueger, Parchim (DE); Torsten Baustian, Crivitz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 735 days.

(21) Appl. No.: 11/572,169

(22) PCT Filed: Jul. 4, 2005

(86) PCT No.: PCT/DE2005/001176

§ 371 (c)(1), (2), (4) Date: Aug. 21, 2007

(87) PCT Pub. No.: WO2006/005307

PCT Pub. Date: Jan. 19, 2006

(65) Prior Publication Data

US 2008/0042377 A1 Feb. 21, 2008

(30) Foreign Application Priority Data

Jul. 14, 2004 (DE) .................. 10 2004 034 217

(51) Int. Cl.
B60G 21/055 (2006.01)
(52) U.S. Cl. .................. 280/5.511; 280/124.107
(58) Field of Classification Search .......... 280/5.511, 280/5.512, 5.515, 124.106, 124.107, 124.152
See application file for complete search history.

(56) References Cited

U.S. PATENT DOCUMENTS

| | | | | |
|---|---|---|---|---|
| 2,781,027 A | * | 2/1957 | Henry | 92/122 |
| 3,197,233 A | * | 7/1965 | Bauer et al. | 280/5.502 |
| 5,573,265 A | * | 11/1996 | Pradel et al. | 280/124.107 |
| 5,575,502 A | * | 11/1996 | Oppitz et al. | 280/124.166 |
| 5,601,165 A | * | 2/1997 | Oppitz et al. | 188/296 |
| 5,632,502 A | * | 5/1997 | Oppitz et al. | 280/124.106 |
| 5,700,027 A | | 12/1997 | Schiffler | |
| 5,791,444 A | * | 8/1998 | Schiffler | 188/293 |
| 6,149,166 A | * | 11/2000 | Struss et al. | 280/5.511 |
| 6,318,737 B1 | * | 11/2001 | Marechal et al. | 280/5.511 |
| 6,361,033 B1 | * | 3/2002 | Jones et al. | 267/187 |
| 6,439,583 B1 | * | 8/2002 | Markowetz | 280/5.511 |

(Continued)

FOREIGN PATENT DOCUMENTS

DE 1 105 290 10/1961

(Continued)

Primary Examiner—Paul N Dickson
Assistant Examiner—Laura Freedman
(74) Attorney, Agent, or Firm—McGlew and Tuttle, P.C.

(57) ABSTRACT

An improve spring rate of a stabilizer is provided with an extended spring length. An inner rotary part (4) of an oscillating motor (2) and a second stabilizer part (1) are connected to one another with a non-positive connection (force transmitting friction connection) designed such that the axial center of the force-transmitting length of the second stabilizer part (1) and the axial center of the force-transmitting length of the inner rotary part (4) are located on a common radial plane. The non-positive connection between the inner rotary part (4) and a fitting cylinder (14) of the second stabilizer part (1) is formed either from a shrunk-on fit or a toothed part (21) and a fitting part (22), wherein the toothed part (21) and the fitting part (22) are likewise shrunk on.

9 Claims, 4 Drawing Sheets

U.S. PATENT DOCUMENTS

| | | | |
|---|---|---|---|
| 6,811,166 B2 * | 11/2004 | Carlstedt et al. | 280/124.152 |
| 6,880,451 B2 * | 4/2005 | Beilner et al. | 92/121 |
| 6,948,707 B2 * | 9/2005 | Gradu | 267/191 |
| 7,150,458 B2 * | 12/2006 | Reichel et al. | 280/5.511 |
| 7,204,494 B2 * | 4/2007 | Reichel et al. | 280/5.506 |

FOREIGN PATENT DOCUMENTS

| | | |
|---|---|---|
| DE | 197 54 539 A1 | 6/1999 |
| DE | 199 62 035 A1 | 7/2000 |
| DE | 100 12 915 A1 | 4/2001 |
| DE | 102 43 696 B3 | 3/2004 |
| EP | 1 424 509 A1 | 6/2004 |
| JP | 10-54405 | 2/1998 |

\* cited by examiner

SPLIT STABILIZER WITH OPTIMIZED SPRING RATE

CROSS REFERENCE TO RELATED APPLICATIONS

This application is a United States National Phase application of International Application PCT/DE2005/001176 and claims the benefit of priority under 35 U.S.C. §119 of German Patent Application DE 10 2004 034 217.2 filed Jul. 14, 2007, the entire contents of which are incorporated herein by reference.

FIELD OF THE INVENTION

The present invention pertains to a split stabilizer. Such stabilizers are used especially in automotive engineering.

BACKGROUND OF THE INVENTION

In principle, a stabilizer, which operates according to the principle of the torsion bar, is arranged in parallel to the vehicle axle and is fastened to a wheel suspension at both ends, is assigned to each axle of a motor vehicle. This stabilizer substantially prevents or weakens the transmission of the rolling motions, which are caused by the road conditions and originate from the wheels to the vehicle. Such rolling motions occur especially in road curves or under rough road conditions.

The dimensions and the material properties of one-part stabilizers are designed for a predetermined spring rate, so that they can absorb torsional forces and generate corresponding opposing forces in a certain order of magnitude only. Therefore, the response of one-part stabilizers to different loads is either too weak or too hard, which has an unfavorable effect on driving smoothness. One-part stabilizers for motor vehicles, which are intended for use both on the road and off the road, are therefore suitable only conditionally. A split stabilizer, which comprises two stabilizer parts and in which the two are connected to one another via an actuator that increases the angle of rotation, is therefore used for such applications. Such an actuator may be, for example, a hydraulic oscillating motor, an elastic rotary coupling or a shiftable coupling.

Each of these actuators comprises, in principle, an outer rotary part, which is connected via a cover and a flange to one of the two stabilizer parts, and an inner rotary part, which is in connection with the other stabilizer part via a shaft. Both rotary parts of the actuator are designed such that they are rotatable over a limited angle. Conventional clamping or screw bushes are used, as a rule, as connecting parts between the flange and one of the stabilizer parts as well as between the shaft and the other stabilizer part.

Such split stabilizers meet the great variety of requirements. However, they have an essential drawback. Thus, each actuator is a compact unit with a considerable longitudinal extension, which is to a corresponding extent to the detriment of the effective springing lengths of the two stabilizer parts.

To improve the spring rate, s split stabilizer with an optimized spring rate is known from DE 100 12 915 A1, in which the outer rotary part of the actuator and one stabilizer part as well as the inner rotary part of the actuator and the other stabilizer part are each made in one piece. One stabilizer part is thus extended up into the radial plane of the force-generating rotary parts of the actuator, so that the two stabilizer parts are effectively interrupted only by a short axial distance from one another. This has functional advantages, but it can be manufactured with an increased effort only because of the length and the multiply curved shape of the stabilizer part as well as because of the necessary high accuracy of fit of the inner rotary part of the actuator.

A corresponding oscillating motor, whose inner rotary part has two axial and opposing blind holes, is known from U.S. Pat. No. 5,700,027. The two blind holes have different depths, the deeper blind hole being provided with an inner profile for connection to a correspondingly shaped first stabilizer part and the shorter blind hole being designed to receive a non-profiled end of the second stabilizer part. The different lengths of the blind holes and the different shapes thereof shall prevent the two stabilizer parts from being transposed during assembly. The bottoms of the two blind holes are designed for this purpose as stops for the two stabilizer parts. The two blind holes are axially spaced from one another to the extent that a sufficient installation space is left for passing through connection channels for the pressure and suction chambers of the oscillating motor.

Even though the drawbacks in terms of manufacture compared to the one-part variant are eliminated with the two-part design and the profiled connection of the inner rotary part to one stabilizer part, an increase in the manufacturing effort for connecting the outer rotary part to the second stabilizer part must again be accepted at the same time due to the necessity of the second blind hole in the inner rotary part. In addition, the cost is increased by the fact that the force-transmitting profile in the blind hole can be shaped in a complicated manner only. It is also disadvantageous that the profiled connection between the inner rotary part and the corresponding stabilizer part is designed as a pure positive-locking connection. However, such a positive-locking connection is associated, in principle, with a clearance between the two components, which entails functional drawbacks and can be minimized by the manufacturing technology at an unacceptably great effort only.

However, a substantial drawback develops due to the fact that the profiled connection of the inner rotary part to the first stabilizer part is arranged outside the axial center of the axial length of the rotary wing, which the axial length is decisive for the generation of the force. This is due to the presence of the opposite blind hole and the radial pressure chamber connection channels. This eccentricity leads to a shortening of the effective spring length of the first stabilizer part and hence to a deterioration of the spring rate.

SUMMARY OF THE INVENTION

The object is therefore to extend the effective spring length of one stabilizer part of a stabilizer of this type.

According to the invention, a split stabilizer is provided with optimized spring rate. The split stabilizer comprises a first stabilizer part, a second stabilizer part and an oscillating motor. The first stabilizer part, the second stabilizer part and the oscillating motor all are arranged with a common axis. The oscillating motor comprises an outer rotary part and an inner rotary part, which form a pressure space and a suction space in cooperation with a bearing cover and with a flange cover. The outer rotary part and the first stabilizer are connected by a force-transmitting friction connection, also termed a non-positive connection, between the inner rotary part of the oscillating motor and the second stabilizer part such that the inner rotary part of the oscillating motor and the second stabilizer part rotate in unison. An axial center of a force-transmitting friction engagement length of the second stabilizer part and an axial center of a force-transmitting friction engagement length of the inner rotary part are located in or on a common plane.

The force-transmitting friction connection or non-positive connection between the inner rotary part and the second stabilizer part advantageously comprises a shrunk-on fit connection.

The novel split stabilizer eliminates the drawbacks of the state of the art.

The special advantage is in the optimal utilization of the spring length of the stabilizer part because the axial center of the force-transmitting length of the second stabilizer part and the axial center of the force-transmitting length of the inner rotary part are located on a common radial plane. The effective spring length of the second stabilizer part is thus optimally extended and the effective length of the outer rotary part is optimally shortened. As a result, the spring rate of the split stabilizer improves compared to the comparable state of the art described in U.S. Pat. No. 5,700,027, which comes closest, as far as it is possible in a one-part design between the inner rotary part and one stabilizer part according to DE 100 12 915 A1, which is mentioned in the state of the art.

The manufacture of the novel, non-positive connection between the inner rotary part and the stabilizer part is simpler and less expensive compared to both U.S. Pat. No. 5,700,027 and DE 100 12 915 A1.

Thus, it is advantageous that the inner rotary part is designed with a continuous fitting hole and the corresponding stabilizer part with a fitting cylinder and this fitting connection is provided with a negative clearance and shrunk together. This type of connection can be prepared at a very low cost because simple and conventional machining methods can be used.

It is also very advantageous as an alternative to connect the inner rotary part to a connecting pin of the corresponding stabilizer part via a toothed part and a fitting part, wherein both the toothed part and the fitting part are manufactured with a negative clearance and are then shrunk together. The shrunk teeth and the shrunk fit are designed here such that both types of connection equally participate in the force transmission.

The use of a toothed part leads at first to the advantage that security against rotation increases with the non-positive connection. On the other hand, the toothing makes possible the highly accurate and easy-to-handle alignment of the stabilizer part with the inner rotary part during the mounting of the oscillating motor.

This embodiment with a toothed part and with a fitting part can also be manufactured in a very simple manner because the manufacture of the fitting connection can be carried out according to the conventional method and the manufacture of the toothing in the inner rotary part can be carried out according to the simple and low-cost reaming method.

In oscillating motors with two or more pressure chambers and suction chambers, it is very expedient to introduce the two radial connection channels between the pressure and suction spaces which are under equal pressure and are located opposite each other in the area of the clearance-free fitting connection, because the radial connection channels are now sufficiently sealed against oil leakage by the press fit of the participating components alone towards the outside and among each other. Additional sealing elements can thus be eliminated.

To embody the radial connection channels, it is advantageous for manufacturing technical reasons to provide the corresponding fitting hole of the inner rotary part with two ring channels located next to each other and to connect these two ring channels via radial channels each to the pressure spaces or suction spaces.

The present invention shall be explained in more detail on the basis of two exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 4:
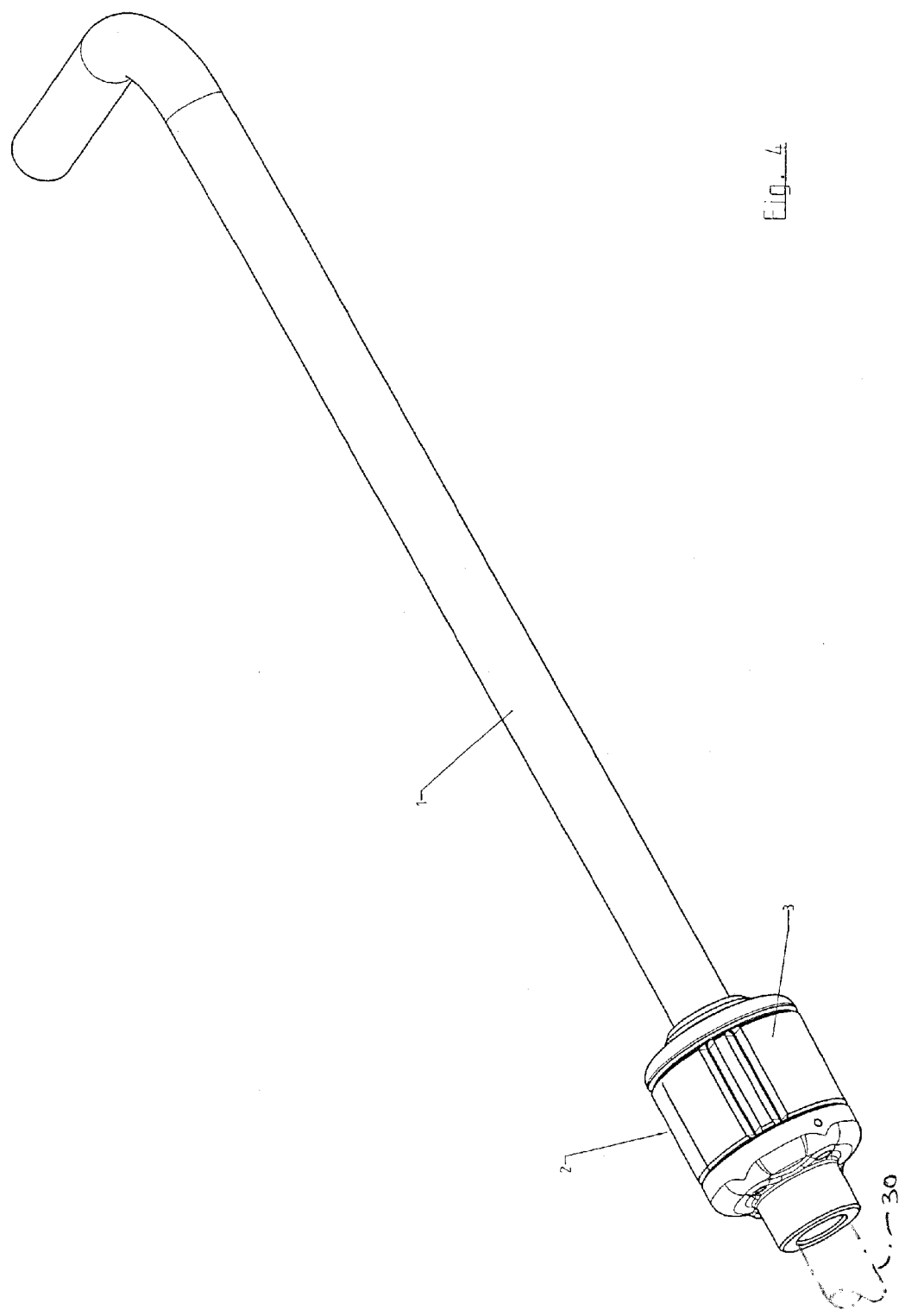
FIG. 4 is the oscillating motor with a stabilizer part.

Referring to the drawings in particular, According to the FIGS. 1 through 4, a split stabilizer comprises a first stabilizer part 30, shown in phantom line in FIG. 4, and a second stabilizer part 1, both of which are connected via a hydraulic oscillating motor 2. The first stabilizer part 30, and the second stabilizer part 1 and the hydraulic oscillating motor 2 are arranged on a common axis. The oscillating motor 2 comprises an outer rotary part 3 and an inner rotary part 4, the outer rotary part 3 having two outer rotary wings 5, which are rigidly connected to the outer rotary part 3 and are directed radially inwardly, and the inner rotary part 4 is formed with two adapted inner rotary wings 6, which are directed radially outwardly. The outer rotary wings 5 and the inner rotary wings 6 are shaped such that they form between them two opposite pressure spaces 7 and two, likewise opposite suction spaces 8. The outer rotary wings 5 and the inner rotary wings 6 are freely rotatable in relation to one another in the area of these pressure spaces 7 and suction spaces 8 until they come into contact with one another. The pressure spaces 7 and the suction spaces 8 are limited axially by a bearing cover 9, on the one hand, and by a flange cover 10, on the other hand, which are preferably welded to the outer rotary part 3 in a pressure-sealed manner. Shaft sealing elements 11 at the inner rotary part 4 and frame sealing elements 12 in the two outer rotary wings 5 and in the two inner rotary wings 6 seal the pressure spaces 7 and the suction spaces 8 towards the outside and also in relation to one another towards the inside. The bearing cover 9 is equipped with an axial bearing bore, into which a corresponding axle journal 13 of the inner rotary part 4 is fitted.

Figure 1:
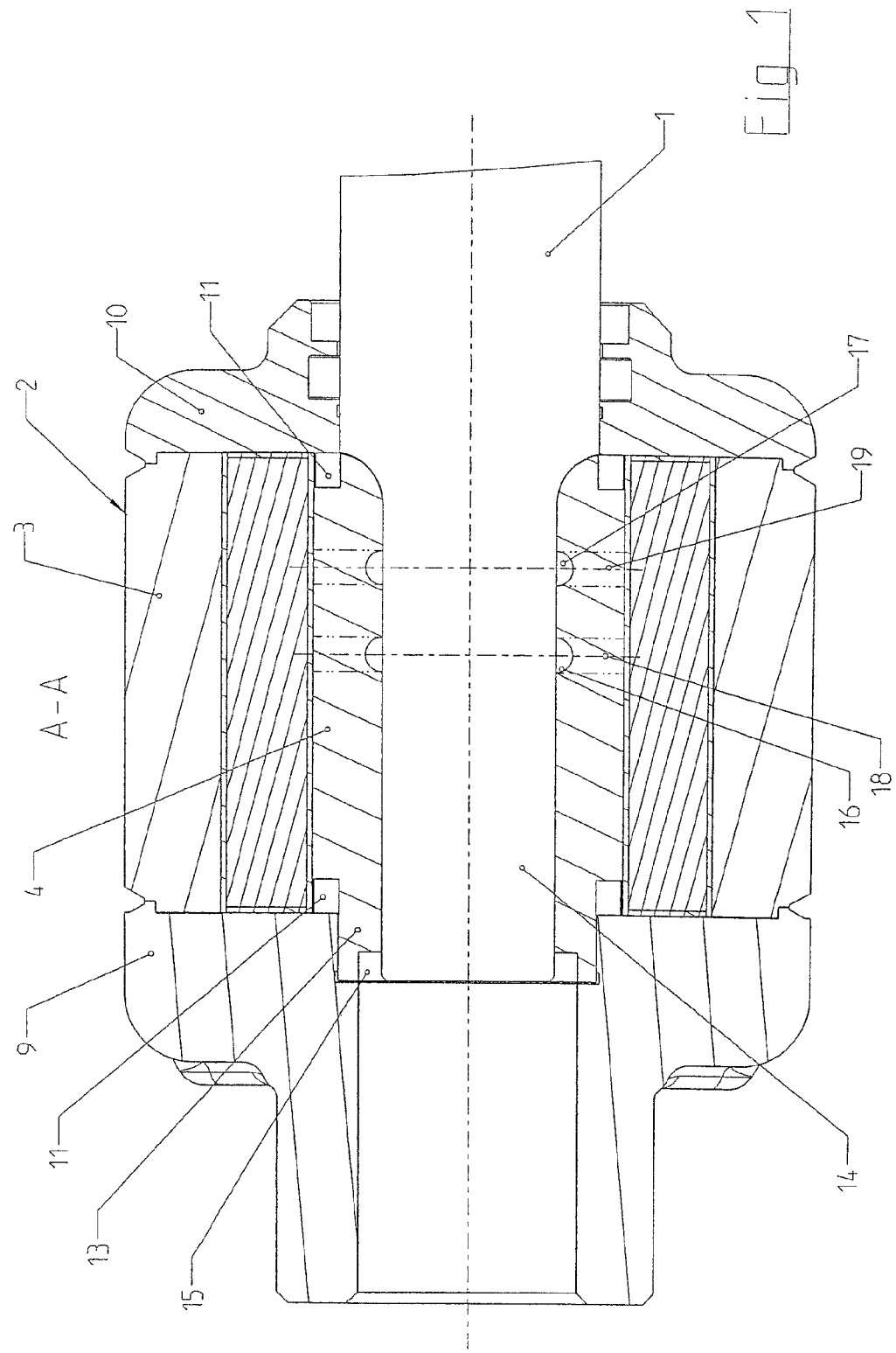
FIG. 1 is a longitudinal section of a first exemplary embodiment of an oscillating motor.

The inner rotary part 4 and the second stabilizer part 1 are connected to one another in a special manner via a press fit in the first exemplary embodiment according to FIG. 1. For this purpose, the inner rotary part 4 has a continuous fitting hole and the second stabilizer part 1 a fitting cylinder 14, which has a reduced diameter compared to the second stabilizer part 1 and extends over the entire axial length of the continuous fitting hole of the inner rotary part 4. The continuous fitting hole of the inner rotary part 4 and the fitting cylinder 14 of the stabilizer part 1 are manufactured with a negative clearance in relation to one another and are connected to one another without clearance by a shrink-on method. In addition, the second stabilizer part 1 is connected to the inner rotary part 4 via a weld seam 15, which is located in the front area of the free end of the fitting cylinder 14 of the second stabilizer part 1. The second stabilizer part 1 and the inner rotary part 4 are connected to one another in a non-positive manner with the shrunk fitting connection (providing a force transmitting friction connection) and the welded connection and are suitable for transmitting a corresponding torque.

In its continuous fitting hole in the area of the shrunk-on fit, the inner rotary part 4 has a first radial ring channel 16 and a second radial ring channel 17, which the ring channels are arranged at axially spaced locations from one another and are covered inwardly by the fitting cylinder 14 of the second stabilizer part 1. The first radial ring channel 16 is connected to the two opposite pressure spaces 7 or suction spaces 8 of the oscillating motor and the second radial ring channel 16 is connected via two radial channels 19 to the two opposite suction spaces 8 or pressure spaces 7. The particular two pressure spaces 7 and the particular two suction spaces 8 are designed such that their pressures are equalized, and the two radial ring channels 16, 17 are closed towards the outside and among each other against oil leakage in a pressure-sealed manner by the press connection between the fitting cylinder 14 of the second stabilizer part 1 and the inner rotary part 4.

Figure 2:
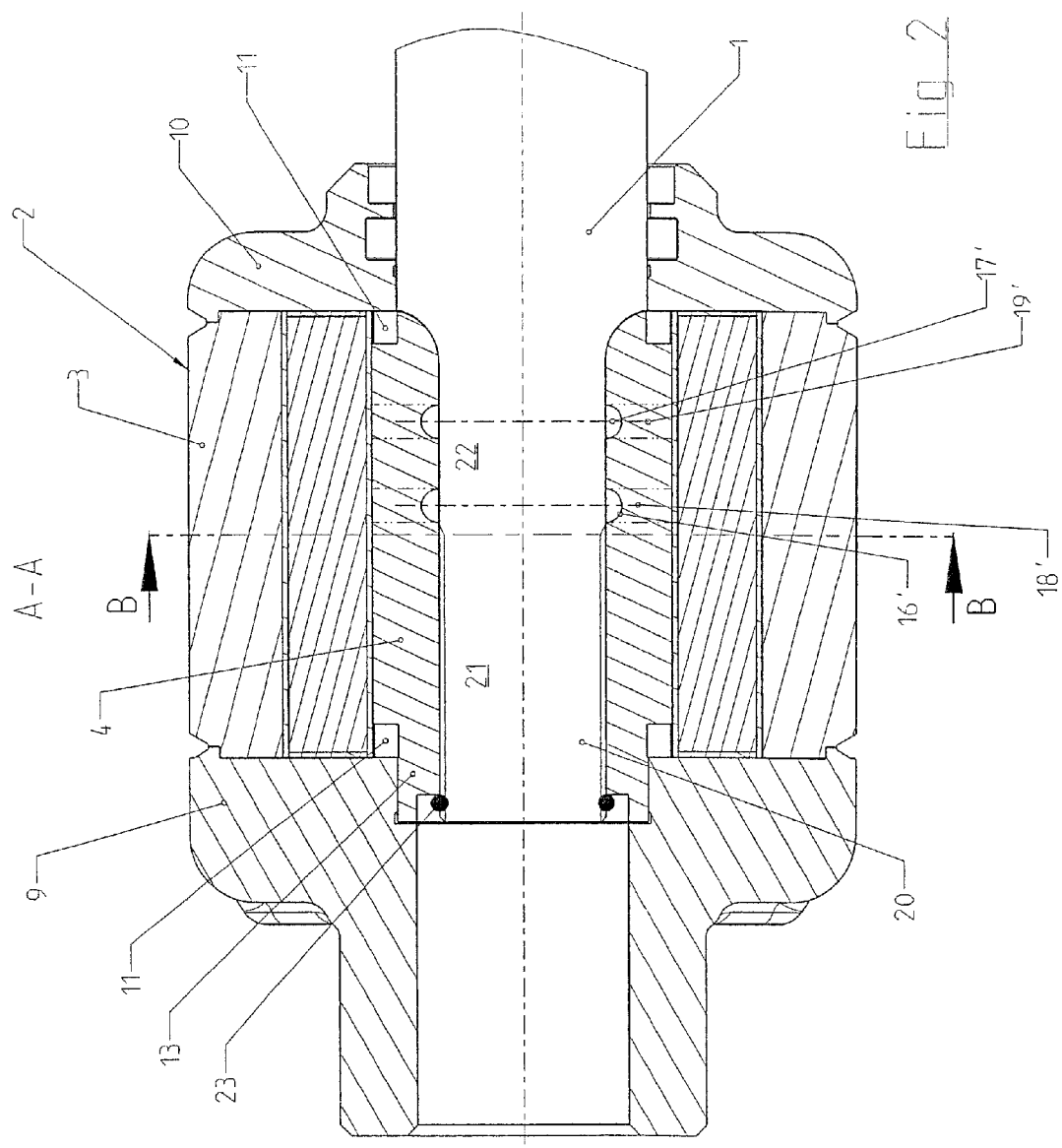
FIG. 2 is a longitudinal section of a second exemplary embodiment of an oscillating motor.
Figure 3:
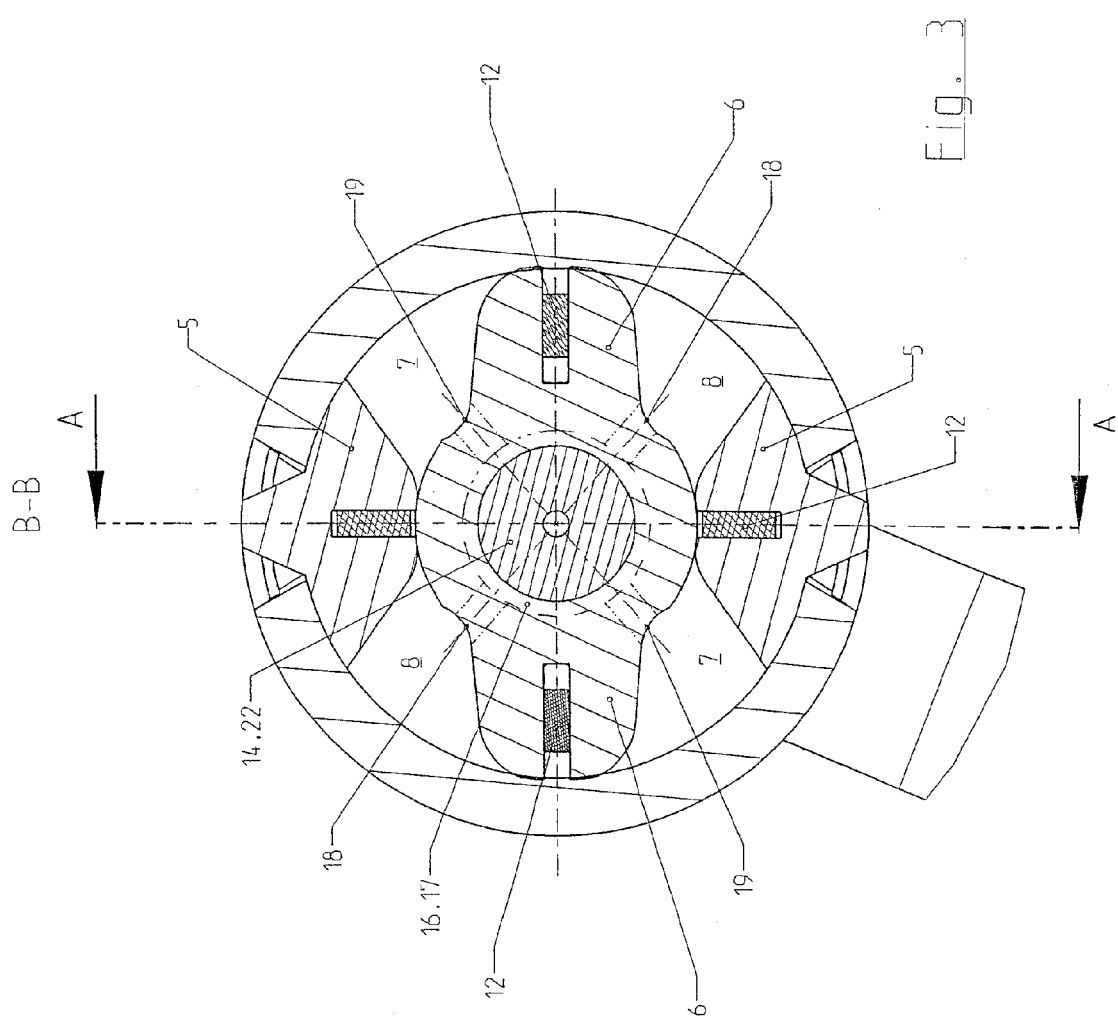
FIG. 3 is a cross section of the two exemplary embodiments of the oscillating motor.

In the second exemplary embodiment according to FIG. 2, the inner rotary part 4 and the second stabilizer part 1 are connected to one another in a special manner via a press fit and teeth. For this purpose, the inner rotary part 4 has again a through hole and the stabilizer part 1 has a continuous connecting pin 20 with reduced diameter compared to the second stabilizer part 1, the through hole and the connecting pin forming a toothed part 21 and a fitting part 22. The toothed part 21 and the fitting part 22 are arranged axially next to each other, the toothed part 21 being located at the free end of the second stabilizer part 1. The toothed part 21 comprises a corresponding inner profile in the through hole of the inner rotary part 4 and an outer profile fitting same at the connecting pin 20 of the second stabilizer part 1, while the fitting part 22 comprises a fitting hole in the inner rotary part 4 and a fitting cylinder at the connecting pin 20 of the second stabilizer part 1.

The profiled connection between the second stabilizer and the inner rotary part 4 has a large number of teeth in order to achieve high carrying capacity of the force-transmitting teeth, on the one hand, and precise and a possibility of sensitive alignment for mounting the second stabilizer part 1 with the inner rotary part 4, on the other hand. The outer profile of the second stabilizer part 1 and the inner profile of the inner rotary part 4 as well as the fitting hole in the inner rotary part 4 and the fitting cylinder at the connecting pin 20 of the second stabilizer part 1 are designed each with a negative clearance in relation to one another and are assembled with one another without clearance according to a shrink-on method. The second stabilizer part 1 and the inner rotary part 4 are thus connected to one another in a positive-locking and non-positive manner and are suitable for transmitting corresponding torques. A retaining ring 23, which assumes an additional axial securing between the second stabilizer part 1 and the inner rotary part 4, is arranged at the free end of the second stabilizer part 1.

In its through hole, the inner rotary part 4 has a first radial ring channel 16' and a second radial ring channel 17', both of which are arranged in the fitting part 22 and at axially spaced locations from one another, in this exemplary embodiment as well. The first radial ring channel 16' is connected here via the two radial channels 18' to the two opposite pressure spaces 7 or suction spaces 8 and the second radial ring channel 17' is connected via the two radial channels 19' to the two opposite suction spaces 8 or pressure spaces 7.

The two respective pressure spaces 7 and the two respective suction spaces 8 are thus designed such that their pressures are equalized, and both radial ring channels 16', 17' are covered by the fitting cylinder of the fitting part 22 and are sealed against oil leakage in a pressure-sealed manner towards the outside and among each other by the press connection between the fitting cylinder of the fitting part 22 and the inner rotary part 4.

While specific embodiments of the invention have been shown and described in detail to illustrate the application of the principles of the invention, it will be understood that the invention may be embodied otherwise without departing from such principles.

The invention claimed is:

1. A split stabilizer with optimized spring rate, the split stabilizer comprising:
a first stabilizer part;
a second stabilizer part; and
an oscillating motor, said first stabilizer part, said second stabilizer part and said oscillating motor all being arranged on a common axis, wherein said oscillating motor comprises an outer rotary part and an inner rotary part, which form at least one pressure space and a suction space in cooperation with a bearing cover and with a flange cover, and said outer rotary part is connected to said first stabilizer part in such a way that said outer rotary part and said first stabilizer part rotate in unison, and there is a force-transmitting connection between said inner rotary part of said oscillating motor and said second stabilizer part, said inner rotary part and said second stabilizer part are connected to one another with a non-positive connection and the non-positive connection is designed such that an axial center of a force-transmitting length of said second stabilizer part and an axial center of a force-transmitting length of said inner rotary part are located on a common plane, wherein said non-positive connection between said inner rotary part and said second stabilizer part comprises a shrunk-on fit connection between a fitting cylinder of said second stabilizer part and said inner rotary part, said oscillating motor having two or more pressure spaces located opposite each other and two or more suction spaces located opposite each other, said pressure spaces being connected via a radial connection channel, said suction spaces being connected via another radial connection channel, wherein said radial connection channel and said another radial connection channel are prepared in an area of a clearance-free fitting connection between said inner rotary part and said second stabilizer part.

2. A split stabilizer in accordance with claim 1, wherein said inner rotary part and said fitting cylinder are additionally connected via a weld seam, said weld seam being located at a free end of said fitting cylinder.

3. A split stabilizer in accordance with claim 1, wherein said inner rotary part and a connecting pin of said second stabilizer part are additionally secured axially via a retaining ring.

4. A split stabilizer in accordance with claim 1, wherein in an area of said fitting cylinder, a through hole of said inner rotary part has said radial connection channel and said another radial connection channel, which are arranged next to each other and are covered by fitting part of a connecting pin of said second stabilizer part and are connected to said corresponding pressure spaces or said suction spaces via radial channels.

5. A split stabilizer with optimized spring rate, the split stabilizer comprising:
- a first stabilizer part;
- a second stabilizer part; and
- an oscillating motor, said first stabilizer part, said second stabilizer part and said oscillating motor all being arranged with a common axis, wherein said oscillating motor comprises an outer rotary part and an inner rotary part, which form a pressure space and a suction space in cooperation with a bearing cover and with a flange cover, and said outer rotary part and said first stabilizer being connected by a force-transmitting friction connection between said inner rotary part of said oscillating motor and said second stabilizer part such that said inner rotary part of said oscillating motor and said second stabilizer part rotate in unison, wherein an axial center of a force-transmitting friction engagement length of said second stabilizer part and an axial center of a force-transmitting friction engagement length of said inner rotary part are located on a common plane, wherein said force-transmitting friction connection between said inner rotary part and said second stabilizer part comprises a shrunk on connection between a connecting pin of said second stabilizer part and said inner rotary part, said connecting pin comprising a toothed part and a fitting part, with each of said toothed part and said fitting part being shrunk on said inner rotary part, said oscillating motor having two or more oppositely located pressure spaces and two or more oppositely located suction spaces, one of said pressure spaces being connected to another one of said pressure spaces via a first radial connection channel, one of said suction spaces being connected to another one of said suction spaces via a second radial connection channel, wherein said first radial connection channel and said second radial connection channel are prepared in an area of a clearance-free fitting connection between said inner rotary part and said second stabilizer part.

6. A split stabilizer in accordance with claim 5, wherein said inner rotary part and said fitting part are additionally connected via a weld seam, said weld seam being located at a free end of said fitting part.

7. A split stabilizer in accordance with claim 5, wherein said inner rotary part and said connecting pin are additionally secured axially via a retaining ring.

8. A split stabilizer in accordance with claim 5, wherein in an area of said fitting part, the through hole of said inner rotary part has said first radial connection channel and said second radial connection channel, which are arranged next to each other and are covered by said fitting part of said connecting pin and are connected to said corresponding pressure spaces or said suction spaces via radial channels.

9. A split stabilizer with optimized spring rate, the split stabilizer comprising:
- a first stabilizer part;
- a second stabilizer part; and
- an oscillating motor, said first stabilizer part, said second stabilizer part and said oscillating motor all being arranged with a common axis, wherein said oscillating motor comprises an outer rotary part and an inner rotary part, which form a pressure space and a suction space in cooperation with a bearing cover and with a flange cover, and said outer rotary part and said first stabilizer being connected by a force-transmitting friction connection between said inner rotary part of said oscillating motor and said second stabilizer part such that said inner rotary part of said oscillating motor and said second stabilizer part rotate in unison, wherein an axial center of a force-transmitting friction engagement length of said second stabilizer part and an axial center of a force-transmitting friction engagement length of said inner rotary part are located on a common plane, wherein said force-transmitting friction connection between said inner rotary part and said second stabilizer part comprises a shrunk on connection between a connecting pin of said second stabilizer part and said inner rotary part, said connecting pin comprising a toothed part and a fitting part, with each of said toothed part and said fitting part being shrunk on said inner rotary part, said inner rotary part and said connecting pin being additionally secured axially via a retaining ring.

* * * * *